United States Patent
Stager et al.

(10) Patent No.: US 11,649,156 B2
(45) Date of Patent: May 16, 2023

(54) SYSTEM AND METHOD FOR PRE-COOLING FUEL DISPENSER

(71) Applicants: China Energy Investment Corporation Limited, Beijing (CN); National Institute of Clean-and-Low-Carbon Energy, Beijing (CN)

(72) Inventors: Jerad Allen Stager, Richmond, CA (US); Xianming Li, Orefield, PA (US); Anthony Ku, Fremont, CA (US)

(73) Assignees: China Energy Investment Corporation Limited, Beijing (CN); National Institute of Clean-and-Low-Carbon Energy, Beijing (CN)

(*) Notice: Subject to any disclaimer, the term of this patent is extended or adjusted under 35 U.S.C. 154(b) by 81 days.

(21) Appl. No.: 17/135,366

(22) Filed: Dec. 28, 2020

(65) Prior Publication Data
US 2022/0204337 A1    Jun. 30, 2022

(51) Int. Cl.
*F17C 7/04*   (2006.01)
*B67D 7/36*   (2010.01)
(Continued)

(52) U.S. Cl.
CPC .............. *B67D 7/80* (2013.01); *B67D 7/36* (2013.01); *F17C 5/007* (2013.01); *F17C 5/06* (2013.01);
(Continued)

(58) Field of Classification Search
CPC ....... B67D 7/80; B67D 7/36; F17C 2221/012; F17C 5/06; F17C 5/007; F17C 2205/0323;
(Continued)

(56) References Cited

U.S. PATENT DOCUMENTS 6,619,336 B2   9/2003   Cohen et al.
9,771,886 B2*  9/2017   Garner .................. F02D 19/027
(Continued)

FOREIGN PATENT DOCUMENTS

DE    102009037109 A1    2/2011
EP       2175187 A2      4/2010

OTHER PUBLICATIONS

SAE International, Surface Vehicle Standard, "Fueling Protocols for Light Duty Gaseous Hydrogen Surface Vehicles", Sae J2601, Dec. 2016.
(Continued)

*Primary Examiner* — Frederick C Nicolas
(74) *Attorney, Agent, or Firm* — Calfee, Halter & Griswold LLP

(57) ABSTRACT

A system for dispensing a gaseous fuel from a liquefied fuel and a method for operating such a system are provided. The system includes a storage tank, a pressure sensor, a dispenser, a temperature sensor, and a vapor supply unit. The storage tank stores a liquefied fuel including phases of liquid and vapor. The pressure sensor is configured to measure a vapor pressure inside the storage tank. The dispenser is configured to receive the liquefied fuel and dispense the gaseous fuel to a receiving tank. The temperature sensor is configured to measure temperature of the dispenser. The system further includes a vapor supply unit fluidly coupled with the storage tank and configured to provide the vapor of the liquefied fuel from the storage tank into the dispenser or in thermally contact with at least one portion of the dispenser.

19 Claims, 6 Drawing Sheets

(51) Int. Cl.
  *B67D 7/80* (2010.01)
  *F17C 13/04* (2006.01)
  *F17C 13/02* (2006.01)
  *F17C 5/06* (2006.01)
  *F17C 7/00* (2006.01)
  *F17C 5/00* (2006.01)
  *F17C 13/00* (2006.01)
  *F17D 1/14* (2006.01)
  *F17D 3/00* (2006.01)
  *F17D 1/02* (2006.01)

(52) U.S. Cl.
  CPC .................. *F17C 7/00* (2013.01); *F17C 7/04* (2013.01); *F17C 13/002* (2013.01); *F17C 13/025* (2013.01); *F17C 13/026* (2013.01); *F17C 13/04* (2013.01); *F17D 1/02* (2013.01); *F17D 1/14* (2013.01); *F17D 3/00* (2013.01); F17C 2205/0323 (2013.01); F17C 2205/0332 (2013.01); F17C 2205/0376 (2013.01); F17C 2221/012 (2013.01); F17C 2223/0153 (2013.01); F17C 2223/0161 (2013.01); F17C 2223/033 (2013.01); F17C 2225/0115 (2013.01); F17C 2225/0123 (2013.01); F17C 2225/036 (2013.01); F17C 2227/0135 (2013.01); F17C 2227/0306 (2013.01); F17C 2227/0309 (2013.01); F17C 2227/0339 (2013.01); F17C 2227/0388 (2013.01); F17C 2227/0393 (2013.01); F17C 2250/032 (2013.01); F17C 2250/043 (2013.01); F17C 2250/0439 (2013.01); F17C 2250/0626 (2013.01); F17C 2250/0631 (2013.01); F17C 2250/0636 (2013.01); F17C 2260/023 (2013.01); F17C 2260/025 (2013.01); F17C 2265/032 (2013.01); F17C 2265/065 (2013.01); F17C 2270/0168 (2013.01); F17C 2270/0184 (2013.01)

(58) Field of Classification Search
  CPC ...... F17C 2205/0332; F17C 2205/0376; F17C 2223/0161; F17C 2223/033; F17C 2225/0115; F17C 2225/0123; F17C 2225/036; F17C 2227/0135; F17C 2227/0339; F17C 2227/0388; F17C 2227/0393; F17C 2250/032; F17C 2250/043; F17C 2250/0439; F17C 2250/0626; F17C 2250/0631; F17C 2250/0636; F17C 2260/023; F17C 2260/025; F17C 2265/032; F17C 2265/065; F17C 2270/0168; F17C 2270/0184; F17C 7/00; F17C 7/04; F17C 13/002; F17C 13/025; F17C 13/026; F17C 13/04; F17C 2223/0153; F17C 2227/0306; F17C 2227/0309; Y02E 60/32; F17D 1/02; F17D 1/14; F17D 3/01

See application file for complete search history.

(56) References Cited

U.S. PATENT DOCUMENTS

| | | | |
|---|---|---|---|
| 10,400,712 B2* | 9/2019 | Garner | F02M 21/0215 |
| 10,655,784 B2 | 5/2020 | Fujisawa et al. | |
| 11,174,991 B2* | 11/2021 | Thor | F17C 5/02 |
| 2016/0230931 A1 | 8/2016 | Reese et al. | |
| 2016/0290297 A1* | 10/2016 | Batenburg | F02D 19/027 |
| 2017/0254479 A1* | 9/2017 | Petersen | F17C 5/06 |
| 2018/0128210 A1* | 5/2018 | Garner | F02M 21/0215 |
| 2019/0331298 A1 | 10/2019 | Thor et al. | |
| 2020/0248638 A1* | 8/2020 | Engfehr | F02D 19/105 |

OTHER PUBLICATIONS

Lemmon et al., NIST Reference Fluid Thermodynamic and Transport Properties—REFPROP, Jun. 4, 2018, NIST Standard Reference Database 23, National Institute of Standards and Technology, US DOE.

European Patent Office, Extended European Search Report issued in corresponding European Patent Application No. 21154230.3 dated Jul. 12, 2021.

Communication Pursuant to Article 94(3) EPC from European Application No. 21154230.3 dated Nov. 16, 2022 (5 pages).

* cited by examiner

SYSTEM AND METHOD FOR PRE-COOLING FUEL DISPENSER

PRIORITY CLAIM AND CROSS-REFERENCE

None.

FIELD OF THE INVENTION

The disclosure relates to methods and systems for transferring or dispensing a liquefied fuel or a pressurized gas generally. More particularly, the disclosed subject matter relates to a system or a fueling station and a method for fueling or refueling a gaseous hydrogen to vehicles, tanks, or devices.

BACKGROUND

Most of the motor vehicles are powered by internal combustion engines with fossil fuels. Due to limited supply and adverse environmental effects associated with burning these fuels, vehicles are now being developed that are powered by alternative environmentally friendly fuels like hydrogen. The fuel cells can be used to produce electric power by electrochemically reacting hydrogen fuel with an oxidant such as air. Other hydrogen-powered vehicles can be powered by combustion of hydrogen.

Liquefied fuel gases such as hydrogen are stored in pressure vessel storage tanks and dispensed into receiving vehicle tanks via fuel dispensers. Fueling or refueling a liquefied fuel such as hydrogen to fuel cell vehicles (FCV) and other hydrogen-powered vehicles presents different challenges from adding petroleum-based fuels like gasoline into a vehicle.

U.S. Pat. No. 6,619,336 discloses a system and method for dispensing a pressurized gas. The system may include a refrigeration system for cooling the gas exiting the pressurized gas source. The refrigeration system may use a mechanical refrigeration cycle with a hydrofluorocarbon. The refrigeration system may include a liquid hydrogen source and a cold storage device, wherein the cold storage device is cooled by hydrogen from the liquid hydrogen source and the refrigeration system also includes a heat exchanger adapted to receive and cool gas exiting the pressurized gas source prior to its flowing to the receiving tank. The cold storage device may use a condensable refrigerant to store the refrigeration until cooling is needed when filling the receiving tank. The refrigerant may be a hydrofluorocarbon. The cold storage device may also use a compressed gas such as argon or nitrogen. The refrigeration system may include a refrigerated container that at least partially surrounds the pressurized gas source.

SUMMARY OF THE INVENTION

The present disclosure provides a system for dispensing a gaseous fuel from a liquefied fuel, a method of using or operating such a system such as a fuel station, and a method of refueling a gaseous fuel such as hydrogen into a vehicle.

In accordance with some embodiments, such a system for dispensing a liquefied fuel comprising a storage tank, a pressure sensor, a dispenser, a heat exchanger, a temperature sensor, and a vapor supply unit. The storage tank is configured to store a liquefied fuel therein. The liquefied fuel comprises phases of liquid and vapor. The pressure sensor is coupled to the storage tank and configured to measure a vapor pressure inside the storage tank. The dispenser is configured to receive the liquefied fuel from the storage tank. The heat exchanger is thermally coupled with the dispenser and configured to convert the liquefied fuel in the dispenser to a gaseous fuel. The dispenser is configured to dispense the gaseous fuel to a receiving fuel tank in a vehicle. The dispenser is configured to regulate temperature, pressure, and mass flow rate of the gaseous fuel to the receiving fuel tank.

The temperature sensor is coupled to the dispenser and configured to measure temperature of the dispenser. The vapor supply unit is fluidly coupled with the storage tank and configured to provide the vapor of the liquefied fuel from the storage tank into the dispenser or in thermal contact with at least one portion of the dispenser so as to pre-cool the dispenser before a refueling process.

In some embodiments, the system further comprises a pump and a first isolation valve fluidly coupled with the storage tank, and is also fluidly connected with the dispenser. The pump and the first isolation valve are configured to provide the liquefied fuel in the liquid phase to the dispenser.

In some embodiments, the vapor supply unit is configured to adjust flow rate of the vapor of the liquefied fuel so as to maintain the vapor pressure inside the storage tank and the temperature of the dispenser within predetermined ranges. In some embodiments, the vapor supply unit comprises a second isolation valve configured to adjust the flow rate of the vapor of the liquefied fuel. The adjustment is based on the inputs of the vapor pressure inside the storage tank and the temperature of the dispenser. The system may further comprise an electronic controller electronically connected with the pressure sensor and the temperature sensor, and configured to adjust the flow rate of the vapor of the liquefied fuel based on the vapor pressure inside the storage tank and the temperature of the dispenser within predetermined ranges.

In some embodiments, the system further comprises a refrigeration unit fluidly coupled with the heat exchanger. The heat exchanger and/or the refrigeration unit are configured to adjust the temperature of the dispenser before or during a refueling process. In some embodiments, the heat exchanger is integrally coupled with the dispenser and disposed inside the dispenser.

In some embodiments, the vapor supply unit is configured to supply the vapor of the liquefied fuel from the storage tank into the dispenser. The vapor is used to directly cool the disperser. In some other embodiments, the vapor supply unit is configured to supply the vapor of the liquefied fuel from the storage tank into a circulation line of the heat exchanger. The vapor is used in combination with the heat exchanger and the refrigeration unit to cool the dispenser.

In some embodiments, the vapor supply unit includes no pump or compressor in a path of a vapor from the storage tank to the dispenser.

Examples of a suitable liquefied fuel include, but are not limited to liquefied hydrogen, which may include a liquid phase, a vapor phase, or a combination thereof. In some embodiments, the liquefied fuel comprises or is liquid hydrogen. The fuel is stored as liquid hydrogen in a storage tank and is dispersed as a gaseous hydrogen into a vehicle.

In another aspect, the present disclosure provides a method for operating a system for dispensing a liquefied fuel. In such a method, a liquefied fuel stored inside a storage tank is provided. The liquefied fuel comprises phases of liquid and vapor. A vapor pressure inside the storage tank is measured using a pressure sensor coupled to the storage tank. Temperature inside a dispenser is measured using a temperature sensor coupled to the dispenser. The dispenser, a pump and a first isolation valve are fluidly coupled with the storage tank, and are configured to dispense the liquefied fuel from the storage tank. The heat exchanger is thermally coupled with the dispenser and configured to convert the liquefied fuel in the dispenser to a gaseous fuel. The dispenser is configured to dispense the gaseous fuel to a receiving fuel tank in a vehicle. The dispenser is configured to regulate temperature, pressure, and mass flow rate of the gaseous fuel to the receiving fuel tank.

The method comprises a step of pre-cooling the dispenser before a refueling process using a vapor supply unit fluidly coupled with the storage tank. The supply unit provides the vapor of the liquefied fuel from the storage tank into the dispenser or in thermally contact with at least one portion of the dispenser.

In some embodiments, the method further comprises adjusting a flow rate of the vapor of the liquefied fuel through a second isolation valve in the vapor supply unit so as to maintain the vapor pressure inside the storage tank and the temperature of the dispenser within predetermined ranges. Such a step of adjustment is performed using an electronic control unit as described herein, according to the vapor pressure inside the storage tank and the temperature of the dispenser as the input information. In some embodiments, the pressure of the storage tank is maintained below a pressure relief valve setting.

In some embodiments, the method further comprises a step of dispensing the gaseous fuel into a receiving fuel tank in a vehicle through the dispenser in the refueling process.

The dispenser is pre-cooled so that the refueling process can be performed very quickly under the temperature and pressure specified based on the standard SAE J2601. In some embodiments, the dispenser is pre-cooled to provide a start-up time within a time limit selected the group consisting of 10 minutes, 9 minutes, 7 minutes, 6 minutes, 5 minutes, 4 minutes, and 3 minutes. For example, the start-up time can be within 10 minutes, or within 5 minutes, or within 3 minutes. The gaseous fuel is dispensed in a temperature of the dispenser in a range from 0° C. to −40° C. In some embodiments, the gaseous fuel is dispensed at a pressure being 350 bar (35 MPa) or 700 bar (70 MPa) and the dispenser starts up within 10 minutes.

In some embodiments, the method includes a step or steps of adjusting the temperature of the dispenser before or during a refueling process using a heat exchanger thermally coupled with the dispenser, and a refrigeration unit fluidly coupled with the heat exchanger. The vapor of the liquefied fuel from the storage tank may be provided into a circulation line of the heat exchanger. In some embodiments, the liquefied fuel comprises hydrogen, and the dispenser starts up within 3 minutes.

The system and the method as described herein can keep the dispenser at a desired low temperature using the vapor of the liquefied fuel so that the dispenser is ready for refueling. The refueling process can be performed continuously without or with minimal idle time.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

Figure 1:
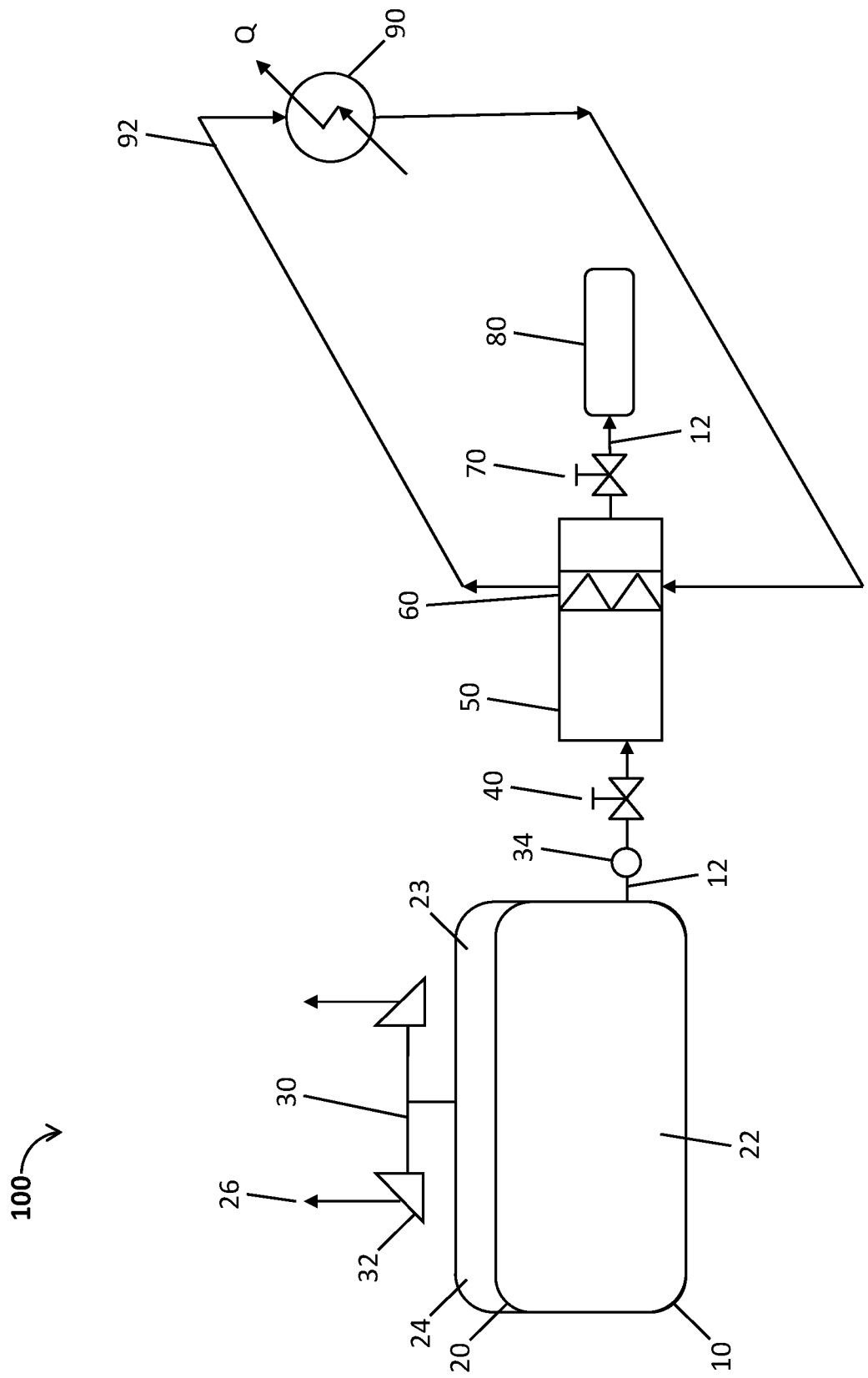
FIG. 1 is a block diagram illustrating a system for dispensing a gaseous fuel from a liquefied fuel in some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

Unless it is expressly stated otherwise, the term "substantially constant" or "substantially the same" used herein will be understood to encompass a parameter with a fluctuation in a suitable range, for example, with ±10% or ±15% fluctuation of the parameter. In some embodiments, the range of fluctuation is within ±10%.

In the present disclosure, the terms "fueling" and "refueling" are used interchangeably. For example, unless expressly stated otherwise, the terms "fueling a vehicle" and "refueling a vehicle" have the same meaning.

Unless expressly indicated otherwise, references to "a liquefied fuel" made herein will be understood to encompass any liquid fuel comprising a pressurized or compressed gas. Such a liquid fuel may also include a mixture of a liquid phase from the pressurized or compressed gas and a gas phase. Examples of a suitable liquefied fuel include, but are not limited to liquefied hydrogen, which may include a liquid phase, a vapor phase, or a combination thereof. In some embodiments, the liquefied fuel comprises or is liquid hydrogen. The fuel is stored as liquid hydrogen in a storage tank and is dispersed as a gaseous hydrogen into a vehicle.

Unless expressly indicated otherwise, "state of charge" (SOC) described herein is defined as a ratio of actual density of a gas from liquefied fuel such as $H_2$ in the vehicle storage tank to that at 350 bar (35 MPa) and 15° C. Such a ratio can be percentage in percentage (%).

Unless expressly indicated otherwise, references to "fill pressure" made herein will be understood to refer to the pressure inside the vehicle storage tank (i.e. an onboard fuel tank), and references to "pumping pressure" or "nozzle pressure" made herein refers to the discharge pressure of the pump (or the nozzle) for fuel such as hydrogen. The difference between pumping pressure and fill pressure is the pressure drop across the piping and additional equipment such as heat exchangers and flow regulator in the dispensing system. Nozzle pressure is essentially equal to the fill pressure with only minor pressure losses downstream the regulator. Sometimes with zero or negligible pressure drop, the fill pressure and pumping pressure are approximately the same.

As used herein, when an element or component is described as forming a "connected to," "coupled to," "coupled with" or "in contact with" another element or component, it can be directly connected to, directly coupled with, in direct contact with, or intervening elements or components may be connected, coupled or in contact with the particular element or component. When an element or component is referred to as being "directly connected to," "directly coupled to," "directly coupled with," or "directly in contact with" another element, there are no intervening elements or components.

As used herein, the terms "thermally coupled to" or "thermally coupled with" used herein will be understood that the components are coupled together directly or through an intervening component so that heat can be transferred among the components, and the components may be in direct contacted with each other or the intervening component contact the components. As used herein, the terms "fluidly coupled to" or "fluidly coupled with" used herein will be understood that the components are connected with pipes or lines and configured to have gas or liquid flow through the components. As used herein, the terms "electronically connected" or "electrically connected" used herein will be understood to encompass electrical connection using wires or wireless connection.

The present disclosure provides a system such as a fueling station for dispensing a gaseous fuel from a liquefied fuel, a method of using or operating such a system, and a method for fueling or refueling a fuel such as hydrogen to vehicles, tanks, or devices.

Figure 3:
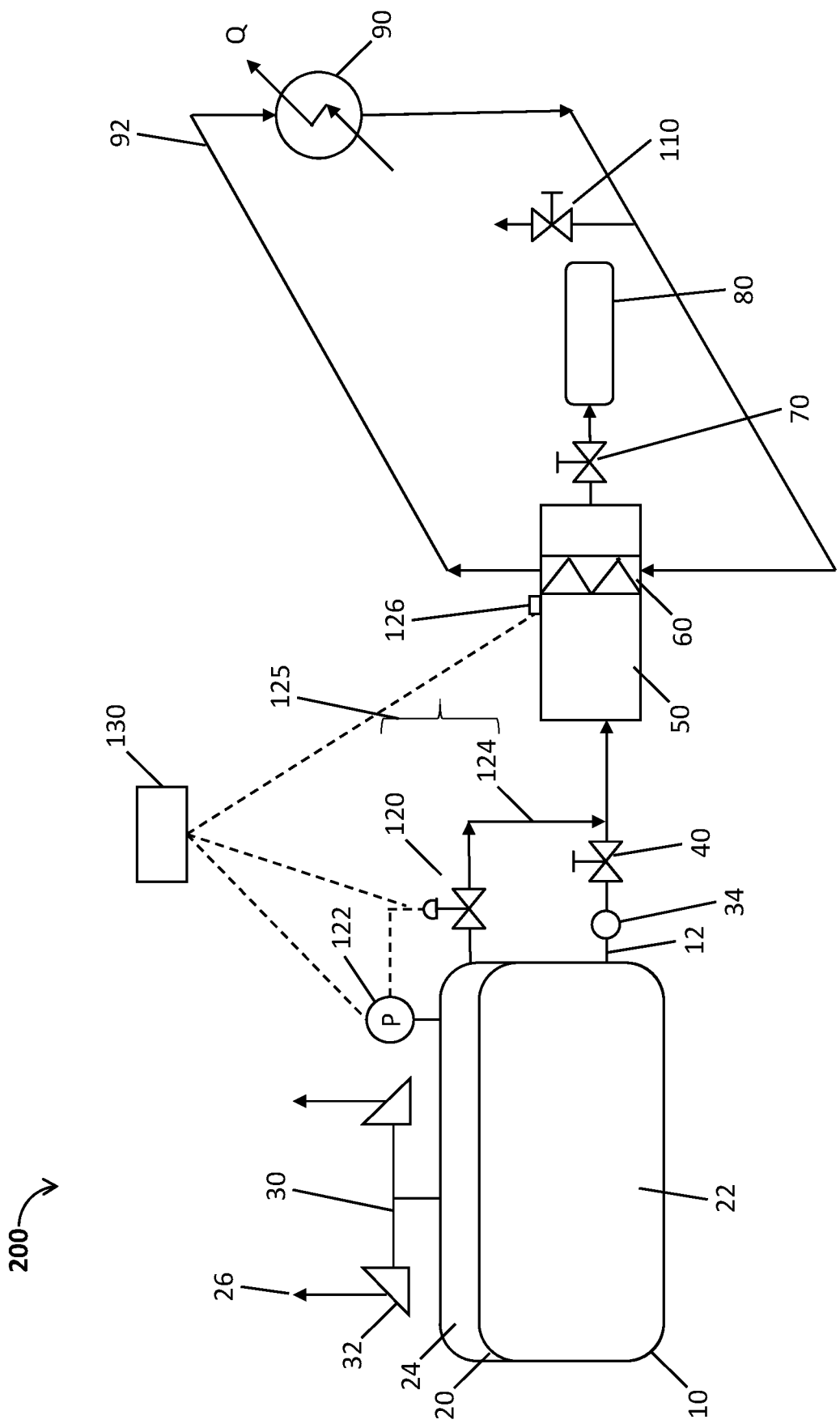
FIG. 3 is a block diagram illustrating a first exemplary system for dispensing a gaseous fuel from a liquefied fuel comprising one unit configured to pre-cool a dispenser using the boil-off vapor from the liquefied fuel in accordance with some embodiments.
Figure 4:
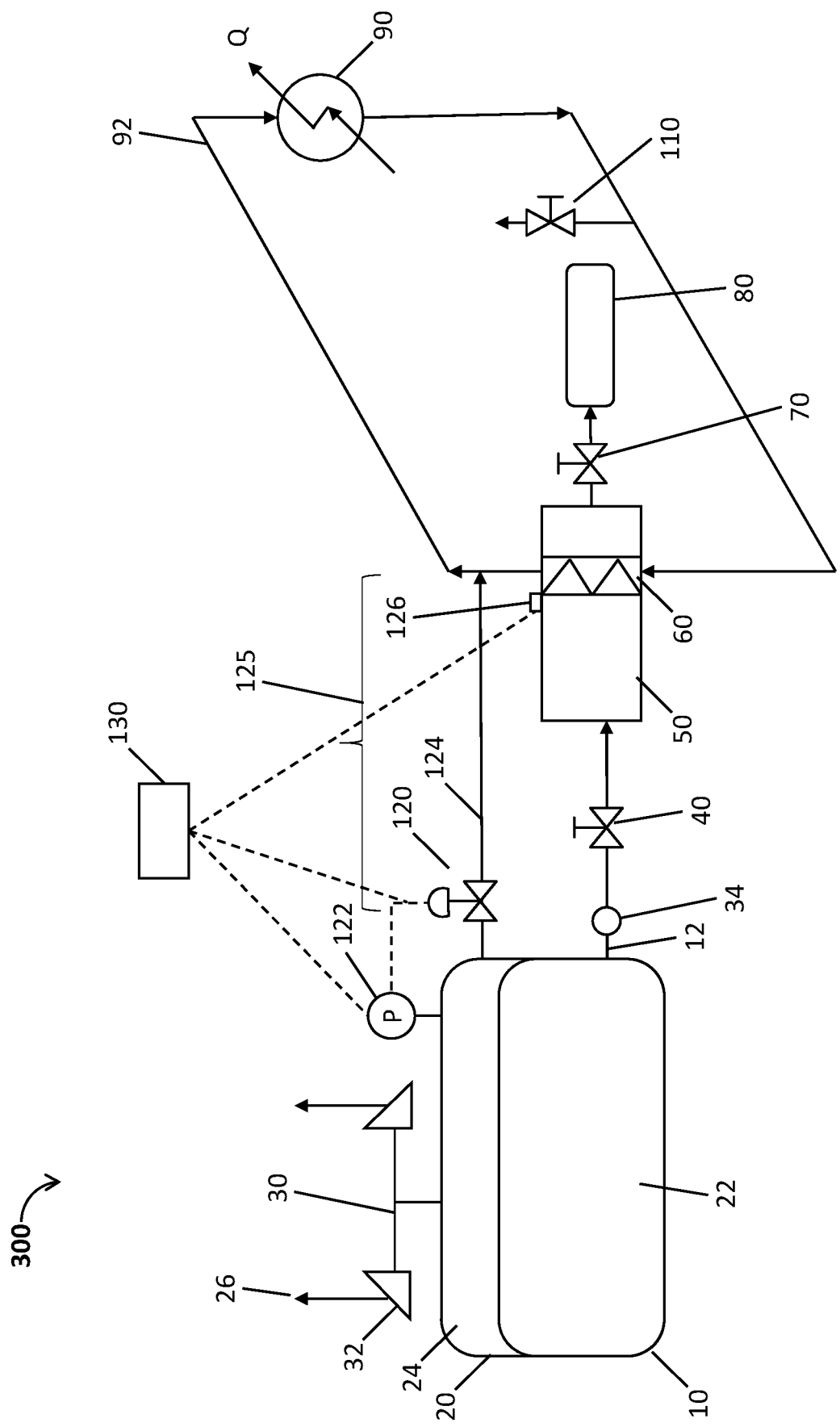
FIG. 4 is a block diagram illustrating a second exemplary system for dispensing a gaseous fuel from a liquefied fuel comprising one unit configured to pre-cool a dispenser using the boil-off vapor from the liquefied fuel in accordance with some embodiments.
Figure 5:
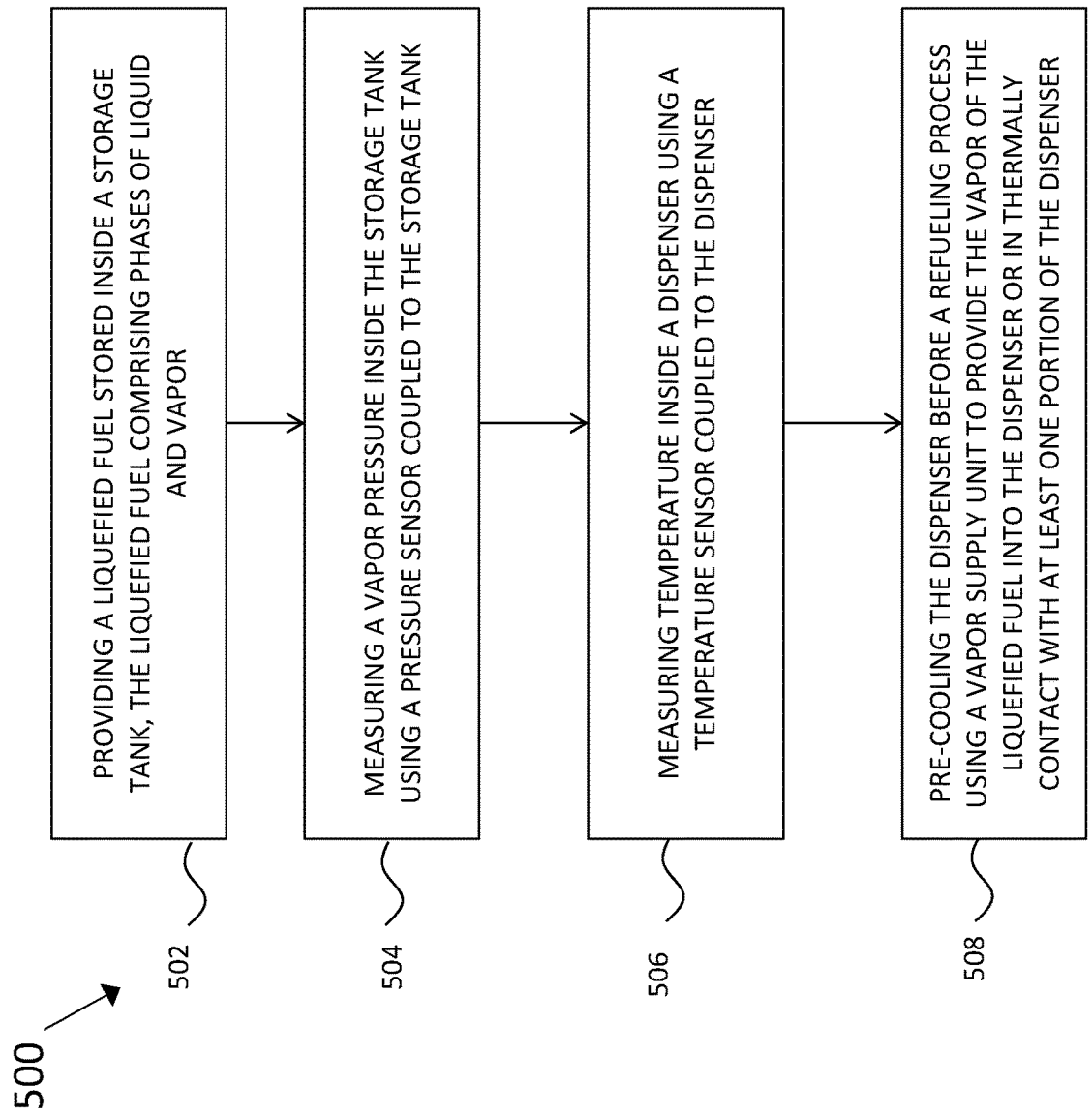
FIG. 5 is a flow chart illustrating an exemplary method for dispensing a gaseous fuel from a liquefied fuel comprising pre-cooling a dispenser using the boil-off vapor from the liquefied fuel in accordance with some embodiments.

In FIGS. 1 and 3-4, like items are indicated by like reference numerals, and for brevity, descriptions of the structure, provided above with reference to the preceding figures, are not repeated. The methods described in FIG. 5 are described with reference to the exemplary structure described in FIGS. 3-4.

The SAE J2601 standard is the first word-wide light duty hydrogen vehicle fueling standard for hydrogen fuel cell electrical vehicles (FCEV). The standard provides guidance for refueling of hydrogen surface vehicles. The standard provides guidance for the filling process in a manner that provides for rapid refueling of on-board storage tanks on the vehicle. The filling process involves delivery of compressed hydrogen to an on-board tank. This compression process results in heating of the tank, and the inlet temperature of the hydrogen fuel must be controlled to manage the final temperature of the tank. The J2601 protocol allows for pre-cooling of the hydrogen fuel to manage the temperature rise of the tank during rapid refueling. The protocol provides guidance in the form of pressure-temperature-flow rate bounds for the filling process. For example, SAE J2601 includes protocols for two pressure classes (35 and 70 MPa), three fuel delivery temperatures (−40° C., −30° C., −20° C.) and compressed hydrogen storage system sizes of various sizes, classified as categories A through D.

The fueling process is subject to strict requirements as stated in SAE J2601, including the pre-cooling the fuel to a specified target within corridor and time constraint. For example for T40 fill where the pre-cooling temperature is targeted at −40° C., the mass-average fuel temperature needs to be controlled between −33° C. and −40° C. for the entire fueling process except the initial 30 second, and any deviation outside this corridor of more than 10 seconds aborts the fill. Similar requirements are set for pressure as well. It is an objective of the present disclosure to develop a method and a system to comply with such requirements.

U.S. Pat. No. 6,619,336 discloses a method and a system to refrigerate the pressurized gas as it is being dispensed to the receiving tank. However, dispensing systems operate on an occasional, on-demand basis. In the method and the system described in U.S. Pat. No. 6,619,336 cannot achieve a fast dispensing, particularly in the start-up stage. Mechanical refrigeration methods are designed to operate at full load in order to cool the fuel as it is being dispensed, but these mechanical systems are too large to keep the dispenser cold when fuel is not being dispensed. In addition, the use of liquid fuel such as liquid hydrogen to cool a dispenser in-between fueling events represents a waste of saleable fuel.

The present disclosure provides a system and a method to solve the problems and meet the needs as described above. Liquefied fuel gases are stored in pressure vessel storage tanks, and a gaseous fuel is dispensed into receiving vehicle tanks via fuel dispensers. The speed of dispensing is improved by refrigerating the fuel as it is dispensed. In accordance with some embodiments, such a system or method utilizes boil-off vapor (or vapor boil-off) from the pressure vessel fuel storage tank as a refrigerant. The vapor boil-off from a liquefied fuel in the storage tank is used as a source of refrigeration that can pre-cool the dispenser, allowing time for the mechanical refrigeration system to ramp up to full load and take over the full load refrigeration duty. The liquefied fuel can be liquid hydrogen (LH2), and the gaseous fuel can be hydrogen gas. In the system and the method provided in the present disclose, the natural boil-off vapor accumulated in the pressure vessel storage tank is used as a refrigerant to refrigerate at least a portion of the dispenser or the whole dispenser in between fueling events. Pre-cooling the dispenser between fueling events stores this valuable refrigeration that would otherwise be wasted, and prevents the refrigeration system from running in-between fueling events. While it's beneficial to reduce boil-off, there are costs and physical limits to such efforts, and finding beneficial use for boil-off is valuable. Pre-cooling the dispenser allows the refrigeration system the time to ramp up to full load quickly and achieve dispensing temperatures between 0° C. and −40° C.

The method or system pre-cools the dispenser so that the dispenser can achieve a fast start-up. Such a method with such a pre-cooling can significantly increase the speed of dispensing.

Referring to FIG. 1, an exemplary system 100 is used in some embodiments. The exemplary system 100 includes a heat exchanger 60, but no pre-cooling using a vapor phase of a liquefied fuel, and is used for dispensing a gaseous fuel from a liquefied fuel.

The system 100 includes a pressure vessel or storage tank 10. The storage tank 10 is configured to store a liquefied fuel 20 such as hydrogen therein, which includes phases of liquid 22 and vapor 24. The vapor phase is in the headspace 23 of the tank 10. A pressure relief valve tree 30 including valves 32 is fluidly connected with the tank 10 in the headspace 23, and is used to release excessive vapor 26.

The system 100 also includes a pump 34, a pressure vessel isolation valve 40, a dispenser 50, a heat exchanger 60, and a dispenser isolation valve 70. A vaporizer is implied in the dispenser 50 but not specifically shown. As illustrated in FIG. 1, the tank 10, the pump 34, the pressure vessel isolation valve 40, the dispenser 50, and a dispenser isolation valve 70 are fluidly connected with each other. Pipe lines 12 may be used for the connection. The isolation valve 70 may be included as a portion of a nozzle, and is configured to add the gaseous fuel from the liquefied fuel to a receiving tank 80 in a vehicle. The heat exchanger 60, which may be known in the industry as a trim cooler that controls the final dispensing temperature to vehicle, is thermally coupled with the dispenser 50. A vaporizer may be combined with the heat exchanger. A refrigeration subsystem or unit 90 may be connected with the heat exchanger 60, through connection lines 92. The heat exchanger 60 is configured to convert the liquefied fuel in the dispenser 50 into the gaseous fuel to be added into the receiving tank 80 of a vehicle.

When liquid hydrogen is stored in the storage tank 10, which is a pressure vessel, the expected natural evaporation due to heat intrusion from the environment may be as high as 3% of nominal mass per day. As the liquid phase 22 of the stored liquefied fuel 20 evaporates and enters the head space 23, the pressure in the headspace 23 rises to the maximum allowable working pressure (MAWP) of the storage tank 10. As required by safety code, such a storage tank or pressure vessel 10 must have the pressure relief valve tree 30 that provides the evaporated liquid, also known as boil-off 24, a pathway to the atmosphere to prevent the pressure from rising above the MAWP. The released extra boil-off or vapor phase 24 is labelled as excessive vapor 26.

Figure 2:
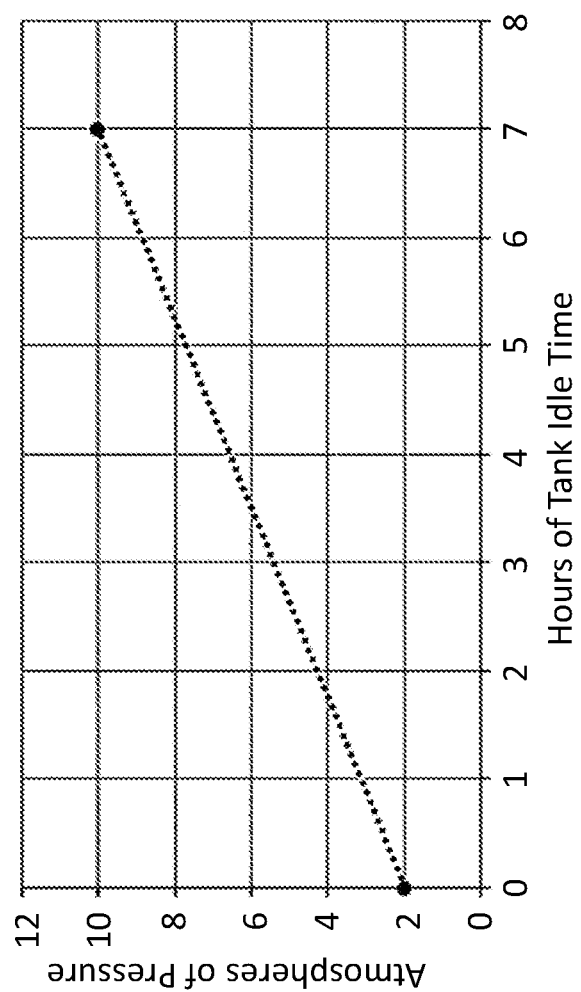
FIG. 2 shows an expected pressure increase in a storage tank comprising a liquefied fuel due to evaporation.

Referring to FIG. 2, assuming the storage tank is 95% filled with liquid fuel to start, if the tank sits idle for 7 hours with no dispensing, the vapor pressure in the headspace 23 will rise from 2 atmospheres to 10 atmospheres. If the tank has an MAWP of 10 atmospheres, then the pressure relief valve tree 30 will have to vent 3%/day of the nominal storage mass in order to keep the tank at 10 atmospheres. For hydrogen fuel, this vapor will be vented at 32 Kelvin (K), thus such vented cold vapor is a significant waste.

To have a desirable fast fueling of the fuel such as gaseous hydrogen, the fueling process needs to occur as close to −40° C. as possible. During idle time between fueling events, the dispenser 50 warms up to ambient temperature, which is above the desired dispensing temperature range of between 0 and −40° C. At the start of dispensing, the refrigeration unit 90 will have to "ramp-up" to full capacity in order to refrigerate the fuel below ambient temperature, which results in lag time, during which the fuel is warmer than the desired dispensing temperature.

In the system of FIG. 1, boil-off vapor is released to the atmosphere at 32 K. As illustrated in FIGS. 3-6, the present disclosure provides a system and a method, which utilize the accumulated boil-off vapor 24 in vapor headspace 23 to pre-cool the dispenser 50 in accordance with some embodiments. This pre-cooling enables fast startup which is defined as cooling the dispensed fuel to between 0 and −40° C. within 30 seconds from the start of dispensing.

In the system of the present disclosure, the cold vapor 24 from the storage tank 10 is delivered through at least a part of the dispenser 50. The cold boil-off vapor 24 will cool the dispenser when the dispenser is in-between fueling events. In the first exemplary system as illustrated in FIG. 3, the cold vapor 24 is directed through the normal flow path that the fuel takes through the dispenser 50, thus pre-cooling the dispenser by direct contact between the dispenser 50 and the cold vapor 24. In the second exemplary system as illustrated in FIG. 4, the cold boil-off vapor 24 travels through the heat exchanger 60 in the refrigeration system 90 and pre-cools the refrigeration system 90. FIG. 3 and FIG. 4 are for illustration only. The first and second exemplary systems in FIGS. 3-4 could be combined to pre-cool both the fuel dispensing flow path and the refrigeration system. After the vapor boil-off 24 from the pressure vessel storage tank 10 has cooled the dispenser 50, it may be released to the atmosphere, or utilized for some other purpose.

Referring to FIG. 3, the first exemplary system 200 is used for dispensing a gaseous fuel (e.g., $H_2$) from a liquefied fuel. Exemplary system 200 comprises a storage tank 10, a dispenser 50, a heat exchanger 60, a pressure sensor 122, a vapor supply unit 125, and a temperature sensor 126. The storage tank 10 is configured to store a liquefied fuel 20 therein. The liquefied fuel 20 comprises phases of liquid 22 and vapor 24. The vapor 24 is in the headspace 23 as described above. A pressure relief valve tree 30 including valves 32 is fluidly connected with the tank 10 in the headspace 23, and is used to release excessive vapor 26. The pressure sensor 122 is coupled to the storage tank 10 and configured to measure a vapor pressure inside the storage tank 10.

In some embodiments, the exemplary system 200 further comprises a pump 34 and a first isolation valve 40 fluidly coupled with the storage tank 10, and is also fluidly connected with the dispenser 50. All the components fluidly coupled together are connected through suitable connection lines 12. The pump 34 and the first isolation valve 40 are configured to provide the liquefied fuel 20 in the liquid phase to the dispenser 50. After being pumped, the liquefied fuel 20 may be in a supercritical state.

The dispenser 50 is configured to receive the liquefied fuel 20 from the storage tank 10. Such a liquefied fuel may be in a supercritical state. A heat exchanger 60 is thermally coupled with the dispenser 50 and configured to convert the liquid phase 22 of the liquefied fuel 20 in the dispenser 50 to a gaseous fuel. The dispenser 50 is configured to dispense the gaseous fuel to a receiving fuel tank 80 in a vehicle. The dispenser 50 is configured to regulate temperature, pressure, and mass flow rate of the gaseous fuel to the receiving fuel tank 80.

The temperature sensor 126 is coupled to the dispenser 50 and configured to measure temperature of the dispenser 50.

The vapor supply unit 125 is fluidly coupled with the storage tank 10 and configured to provide the vapor 24 of the liquefied fuel 20 from the storage tank 10 into the dispenser 50 or in thermally contact with at least one portion of the dispenser 50 so as to pre-cool the dispenser 50 before a refueling process.

In some embodiments, the vapor supply unit 125 is configured to adjust flow rate of the vapor 24 of the liquefied fuel 20 so as to maintain the vapor pressure inside the storage tank 10 and the temperature of the dispenser 50 within predetermined ranges. In some embodiments, the vapor supply unit 125 comprises a second isolation valve 120 and suitable connections 124. The second isolation valve 120 is configured to adjust the flow rate of the vapor 24 of the liquefied fuel 20 going into the dispenser 50 or going to contact at least one portion of the dispenser 50. The adjustment is based on the inputs of the vapor pressure inside the storage tank 10 and the temperature of the dispenser 50. In some embodiments, the second isolation valve 120 is a cryogenic valve with long stems, and can be actuated either manually or automatically. Such valves can be available from suppliers such as ACME Cryogenics Inc. of Pennsylvania, U.S.

The exemplary system 200 may further comprise an electronic controller 130 electronically connected with at least the pressure sensor 122 and the temperature sensor 126, and configured to adjust the flow rate of the vapor 24 of the liquefied fuel 20 through the second isolation valve 120 based on the vapor pressure inside the storage tank 10 and the temperature of the dispenser 50 within predetermined ranges. The electronic controller 130 may be electronically connected with other components, and such electronic connections may be through wire connection, wireless connection, and may include cloud based connection. The electronic controller 130 and all the sensors can be also connected to an industrial control such as a programmable logic controller (PLC), which is supervised by a supervisory control and data acquisition (SCADA) computer with a human-machine interface (HMI). The SCADA computer is versatile and can be programmed to have easy-use features.

In some embodiments, the exemplary system 200 further comprises a refrigeration unit 90 fluidly coupled with the heat exchanger 60 through connection lines 92 with refrigerant inside. The heat exchanger 60 and/or the refrigeration unit 90 are configured to adjust the temperature of the dispenser 50 before or during a refueling process.

In some embodiments, the heat exchanger 60 is integrally coupled with the dispenser 50 and disposed inside the dispenser 50. The refrigerant inside the heat exchanger 60 does not contact or mix with the fuel inside the dispenser 50.

In some embodiments, the vapor supply unit 125 is configured to supply the vapor of the liquefied fuel from the storage tank 10 into the dispenser 50. As illustrated in FIG. 3, the vapor 24 is used to directly cool the disperser 50.

In some embodiments, the vapor supply unit 125 includes no pump or compressor in a path of a vapor from the storage tank 10 to the dispenser 50.

Examples of a suitable liquefied fuel 20 include, but are not limited to liquefied hydrogen, which may include a liquid phase 22, a vapor phase 24, or a combination thereof. In some embodiments, the liquefied fuel 20 comprises or is liquid hydrogen. The fuel is stored as liquid hydrogen in a storage tank 10 and is dispersed as a gaseous hydrogen in a vehicle.

In some embodiments, in the exemplary system 200, the accumulated cold boil-off vapor 24 from the storage tank 10 is conducted through the dispenser 50 via automatic operation of the cold boil-off isolation valve 120. The cold boil-off vapor 24 cools the dispenser 50 by direct contact through a short burst of flow, which may be is released to the atmosphere by a vent valve or can be combined into the gaseous fuel to be added into a vehicle.

In some embodiments, each system described herein may include more than one dispenser 50 for refueling multiple vehicles at the same time.

Table 1 shows the effectiveness of using liquid hydrogen boil-off to cool fuel dispenser(s). Table 1 shows how a 1,000 kg pressure vessel fuel storage tank 10 containing liquid hydrogen can supply enough refrigeration by means of natural evaporation to cool 1 or 2 dispensers. The amount of cold boil-off vapor 24 that is naturally generated every hour and provides enough refrigeration to pre-cool the dispenser(s) to −40° C. By accumulating the natural boil-off in the headspace 23 for 54.9 minutes, then directing the accumulated cold boil-off vapor 24 through the dispenser 50 in a fast burst, the dispenser is pre-cooled to −40° C. in 8.6 seconds. This assumes the cold boil-off vapor 24 flows through the dispenser 50 at a rate equivalent to a normal dispensing rate of 4 kg/min/dispenser.

TABLE 1

| Number of Dispensers | 1 | 2 |
|---|---|---|
| Ambient Temperature (° C.) | 20 | 20 |
| Initial Temperature of Dispenser (° C.) | 20 | 20 |
| Mass of Dispenser (kg of 316 SS) | 50 | 100 |
| Specific Heat of 316 Stainless Steel (kJ/kg/° C.) | 0.50 | 0.50 |
| Desired Pre-cooled Dispenser Temperature (° C.) | −40 | −40 |
| Refrigeration Required (Q) (kJ) | (1,500) | (3,000) |
| Temperature of Hydrogen Vapor from Headspace (° C.) | −241 | −241 |
| Temperature of Hydrogen Vapor to Atmosphere (° C.) | −60 | −60 |
| Mean Specific Heat of Hydrogen (kJ/kg) | 14.5 | 14.5 |
| Energy received by Hydrogen Vapor (kJ) | 1,500 | 3,000 |
| Mass of Hydrogen Vapor used for Refrigeration (kg) | 0.57 | 1.14 |
| Nominal Mass Storage of Fuel in Pressure Vessel (kg) | 1,000 | 1,000 |
| Natural Evaporation Rate (day) | 3% | 3% |
| Boil-off Rate (kg/min) | 0.02 | 0.02 |
| Time to Generate enough vapor for refrigeration (min) | 27.4 | 54.9 |
| Dispenser flow rate (kg/min) | 4 | 8 |
| Time to Refrigerate dispenser using Headspace Vapor (seconds) | 8.6 | 8.6 |

Referring to FIG. 4, a second exemplary system 300 is illustrated. The cold boil-off vapor 24 is used to pre-cool the refrigeration unit 90 and heat exchanger 60 through direct cooling. The exemplary system 300 is the same as the exemplary system 200, except the pre-cooling unit. The vapor supply unit 125 is configured to supply the vapor 24 of the liquefied fuel 20 into a circulation line 92 of the heat exchanger 60 and/or the refrigeration unit 90. In some embodiments, the vapor 24 can be flushed into the refrigeration unit and circuited to the heat exchanger 60 before each refueling process. In some embodiments, the vapor can be used in combination with a refrigerant in the refrigeration unit 90, and work together with the heat exchanger 60 to cool the dispenser 50 before and/or during a refueling process. Referring to FIG. 4, in some other embodiments, the vapor 24 may be supplied to the circulation line 92 to cool the refrigeration unit 90 only without going into the heat exchanger 60. The vapor 24 can be released by a vent valve 110 before going into the heat exchanger 60.

In some embodiments, in the exemplary system 300, the accumulated cold boil-off vapor 24 from the storage tank 10 is conducted through the refrigeration unit 90 by automatic operation of cold boil-off isolation valve 120. The cold boil-off vapor 24 cools the refrigeration unit 90 and its circulation system by direct contact through a short burst of flow that is released to the atmosphere by a vent valve 110.

In accordance with some embodiments, the present disclosure provides a system having the combined features of the exemplary systems 200 and 300. One stream of the boil-off vapor 24 can be directly supplied into the dispenser 50. Another stream of the boil-off vapor 24 can be a circulation line of the refrigeration unit 90 and the heat exchanger 60.

The present disclosure also provides a method for operating such a system as described above. Referring to FIG. 5, an exemplary method 500 may comprise the following generalized steps.

At step 502, a liquefied fuel 20 stored inside a storage tank 10 is provided. The liquefied fuel 20 comprises phases of liquid 22 and vapor 24. Natural evaporation in the storage tank 10 produces pressure in the vapor 24 in the head space 23.

At step 504, a vapor pressure inside the storage tank 10 is measured using the pressure sensor 122 coupled to the storage tank 10.

At step 505, the temperature inside the dispenser 50 is measured using the temperature sensor 126 coupled to the dispenser 50. The pump 34, the first isolation valve 40, and the dispenser 50 are fluidly coupled with the storage tank 10. The heat exchanger 60 is thermally coupled with the dispenser 50 and configured to convert the liquefied fuel 20 in the dispenser 50 to a gaseous fuel. The dispenser 50 is configured to dispense the gaseous fuel to a receiving fuel tank 80 in a vehicle. The dispenser 50 is configured to regulate temperature, pressure, and mass flow rate of the gaseous fuel to the receiving fuel tank 80.

At step 508, the dispenser 50 is pre-cooled before a refueling process using a vapor supply unit 125 fluidly coupled with the storage tank 10. The vapor supply unit 125 provides the vapor 24 of the liquefied fuel 20 from the storage tank 10 into the dispenser 50 or in thermally contact with at least one portion of the dispenser 50 as described above. The boil-off 24 from natural evaporation may directed through the dispenser 50 or in a circulation line for the heat exchanger 60 and the refrigeration unit 90 dispensers 50 so that the vapor 24 is thermally in contact with the dispenser 50. The vapor 24 may be supplied in a short burst of flow. For example, within less than 30 seconds, for example, 8.6 seconds as described in Table 1, the dispenser 50 is pre-cooled to below ambient temperature. In some embodiments, the boil-off 24 may be directed to the atmosphere via vent valve 110 instead of the pressure valve relief tree 30.

Figure 6:
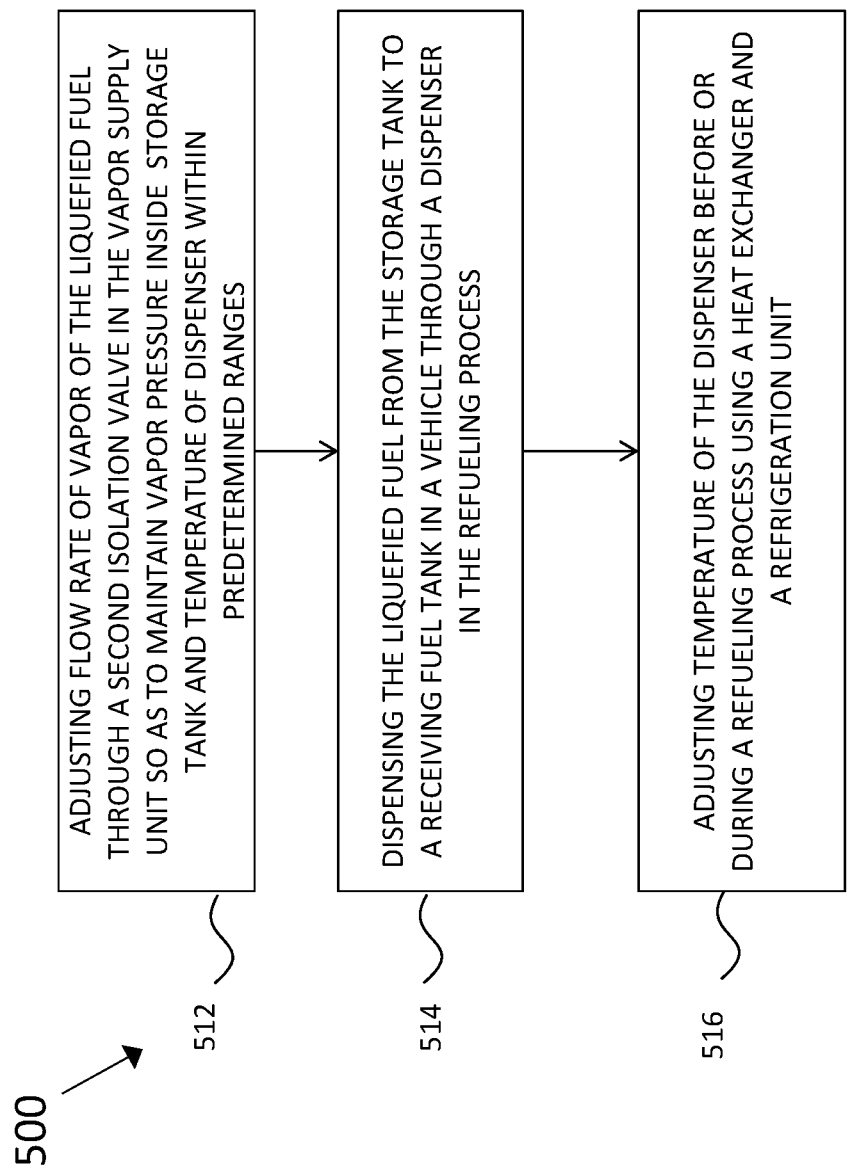
FIG. 6 is a flow chart illustrating the exemplary method of FIG. 5 comprising additional steps.

Referring to FIG. 6, the method 500 may further comprise a step 512 of adjusting a flow rate of the vapor 24 of the liquefied fuel 20 through a second isolation valve 120 in the vapor supply unit 125 so as to maintain the vapor pressure inside the storage tank 10 and the temperature of the dispenser 50 within predetermined ranges. In some embodiments, such a step of adjustment is performed using the 130 electronic control unit, according to the vapor pressure inside the storage tank 10 and the temperature of the dispenser 50 as the input parameters. In some embodiments, the pressure of the storage tank 10 is maintained below a pressure relief valve setting.

At step 514, the gaseous fuel from the liquefied fuel 20 is dispensed into a receiving fuel tank 80 in a vehicle through the dispenser 50 in the refueling process. More than one dispensers 50 can be used to refuel multiple vehicles simultaneously in some embodiments.

The method disclosed herein allows the cold boil-off vapor 24 from the storage tank 10 to be utilized as a refrigerant. The boil-off vapor 24 can be also used to refrigerate the fuel dispenser equipment in order to pre-cool the dispenser 50 in between fueling events.

The dispenser 50 is pre-cooled so that the refueling process can be performed very quickly under the temperature and pressure specified based on the standard SAE J2601. In some embodiments, the dispenser 50 is pre-cooled to provide a start-up time within a time limit selected the group consisting of 10 minutes, 9 minutes, 7 minutes, 6 minutes, 5 minutes, 4 minutes, and 3 minutes. For example, the start-up time can be within 10 minutes, or within 5 minutes, or within 3 minutes. The start-up time is the time of starting up a refueling process following SAE 2601.

The gaseous fuel is dispensed in a temperature of the dispenser 50 in a range from 0° C. to −40° C. In some embodiments, the gaseous fuel is dispensed at a pressure being 350 bar (35 MPa) or 700 bar (70 MPa) and the dispenser 50 starts up within 10 minutes.

In some embodiments, the method includes a step 516 or steps of adjusting the temperature of the dispenser 50 before or during a refueling process using a heat exchanger 60 thermally coupled with the dispenser 50, and a refrigeration unit 90 fluidly coupled with the heat exchanger 60. The vapor 24 of the liquefied fuel 20 from the storage tank 10 may be provided into a circulation line of the heat exchanger. In some embodiments, the liquefied fuel comprises or is hydrogen, and the dispenser 50 starts up within 3 minutes.

In some embodiment, the pre-cooling is performed using the boil-off vapor 24 before a refueling process, and the step of cooling the dispenser 50 during the refueling process is performed using the refrigerant going from the refrigeration unit 90 through the heat exchanger 60.

The methods and system described herein may be at least partially embodied in the form of computer-implemented processes and apparatus for practicing those processes. The disclosed methods may also be at least partially embodied in the form of tangible, non-transient machine readable storage media encoded with computer program code, for example, in the control unit 130. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system for dispensing a fuel, comprising:
a storage tank configured to store a liquefied fuel therein, the liquefied fuel comprising phases of liquid and vapor;
a pressure sensor coupled to the storage tank and configured to measure a vapor pressure inside the storage tank;
a dispenser configured to receive the liquefied fuel from the storage tank;
a heat exchanger thermally coupled with the dispenser and configured to convert the liquefied fuel in the dispenser to a gaseous fuel, the dispenser configured to dispense the gaseous fuel to a receiving fuel tank;
a temperature sensor coupled to the dispenser and configured to measure temperature of the dispenser; and
a vapor supply unit fluidly coupled with the storage tank and configured to provide the vapor of the liquefied fuel from the storage tank into the dispenser or in thermally contact with at least one portion of the dispenser, wherein the vapor supply unit is configured to adjust flow rate of the vapor of the liquefied fuel so as to maintain the vapor pressure inside the storage tank and the temperature of the dispenser within predetermined ranges.

2. The system of claim 1, further comprising a pump and a first isolation valve fluidly coupled with the storage tank and configured to provide the liquefied fuel in the liquid phase to the dispenser.

3. The system of claim 1, wherein the vapor supply unit comprises a second isolation valve configured to adjust the flow rate of the vapor of the liquefied fuel.

4. The system of claim 1, further comprising an electronic controller electronically connected with the pressure sensor and the temperature sensor, and configured to adjust the flow rate of the vapor of the liquefied fuel based on the vapor pressure inside the storage tank and the temperature of the dispenser within predetermined ranges.

5. The system of claim 1, wherein the vapor supply unit is configured to supply the vapor of the liquefied fuel from the storage tank into the dispenser.

6. The system of claim 1, wherein the vapor supply unit is configured to supply the vapor of the liquefied fuel from the storage tank into a circulation line of the heat exchanger.

7. The system of claim 1, further comprising a refrigeration unit fluidly coupled with the heat exchanger, wherein the heat exchanger is integrally coupled with the dispenser and disposed inside the dispenser, and is configured to adjust the temperature of the dispenser before or during a refueling process.

8. The system of claim 1, wherein the vapor supply unit includes no pump or compressor in a path of a vapor from the storage tank to the dispenser.

9. The system of claim 1, wherein the liquefied fuel comprises hydrogen.

10. A method for operating a system for dispensing a fuel, comprising:
providing a liquefied fuel stored inside a storage tank, the liquefied fuel comprising phases of liquid and vapor;
measuring a vapor pressure inside the storage tank using a pressure sensor coupled to the storage tank;
measuring temperature inside a dispenser using a temperature sensor coupled to the dispenser, wherein the dispenser, a pump and a first isolation valve fluidly coupled with the storage tank are configured to dispense the liquefied fuel from the storage tank to the dispenser, and a heat exchanger thermally coupled with the dispenser is configured to convert the liquefied fuel in the dispenser into a gaseous fuel, and the dispenser is configured to dispense the gaseous fuel into a receiving fuel tank; and
pre-cooling the dispenser before a refueling process using a vapor supply unit fluidly coupled with the storage tank to provide the vapor of the liquefied fuel from the storage tank into the dispenser or in thermally contact with at least one portion of the dispenser.

11. The method of claim 10, further comprising adjusting a flow rate of the vapor of the liquefied fuel through a second isolation valve in the vapor supply unit so as to maintain the vapor pressure inside the storage tank and the temperature of the dispenser within predetermined ranges.

12. The method of claim 10, wherein the dispenser is pre-cooled to provide a start-up time within a time limit selected the group consisting of 10 minutes, 9 minutes, 7 minutes, 6 minutes, 5 minutes, 4 minutes, and 3 minutes.

13. The method of claim 10, further comprising
dispensing the gaseous fuel to a receiving fuel tank in a vehicle through the dispenser in the refueling process.

14. The method of claim 13, wherein the gaseous fuel is dispensed in a temperature of the dispenser in a range from 0° C. to −40° C.

15. The method of claim 12, wherein the gaseous fuel is dispensed at a pressure being 350 bar (35 MPa) or 700 bar (70 MPa) and the dispenser starts up within 10 minutes.

16. The method of claim 10, further comprising
adjusting the temperature of the dispenser before or during a refueling process using a heat exchanger thermally coupled with the dispenser, and a refrigeration unit fluidly coupled with the heat exchanger.

17. The method of claim 16, wherein the vapor of the liquefied fuel from the storage tank is provided into a circulation line of the heat exchanger.

18. The method of claim 10, wherein the pressure of the storage tank is maintained below a pressure relief valve setting.

19. The method of claim 10, wherein the liquefied fuel comprises hydrogen, and the dispenser starts up within 3 minutes.

* * * * *